United States Patent [19]

Maycock et al.

[11] Patent Number: 4,744,448
[45] Date of Patent: May 17, 1988

[54] DIAPHRAGM SPRING CLUTCH COVER ASSEMBLY

[75] Inventors: Ian C. Maycock; Peter A. Romer, both of Leamington Spa; Steven Trotman, Snitterfield, all of England

[73] Assignee: Automotive Products plc, Warwickshire, England

[21] Appl. No.: 914,184

[22] Filed: Sep. 30, 1986

[30] Foreign Application Priority Data

Oct. 29, 1985 [GB] United Kingdom ............... 8526570
Nov. 9, 1985 [GB] United Kingdom ............... 8527699

[51] Int. Cl.⁴ ..................... F16D 13/71; F16D 13/50
[52] U.S. Cl. ................... 192/70.27; 192/52; 192/89 B; 192/109 A
[58] Field of Search ............ 192/89 B, 109 A, 70.27, 192/52, 30 V

[56] References Cited

U.S. PATENT DOCUMENTS

| | | | |
|---|---|---|---|
| 3,323,624 | 6/1967 | Maurice | 192/89 B |
| 4,126,216 | 11/1978 | Babcock et al. | 192/89 B |
| 4,184,578 | 1/1980 | Moore et al. | 192/89 B |
| 4,291,792 | 9/1981 | Henao | 192/89 B |
| 4,579,210 | 4/1986 | Meyer et al. | 192/89 B |
| 4,633,989 | 1/1987 | Yoneda | 192/70.27 |
| 4,635,779 | 1/1987 | Bacher et al. | 192/89 B |

FOREIGN PATENT DOCUMENTS

| | | | |
|---|---|---|---|
| 2459921 | 2/1981 | France | 192/89 B |
| 2507268 | 12/1982 | France | 192/70.27 |

*Primary Examiner*—Rodney H. Bonck
*Assistant Examiner*—Richard M. Lorence
*Attorney, Agent, or Firm*—Solon B. Kemon

[57] ABSTRACT

A clutch cover assembly includes a diaphragm spring acting on a pressure plate through a fulcrum ring which encircles the clutch axis and is disposed in a groove in the pressure plate. The fulcrum ring is a resilient tube. During clutch re-engagements, the cross-section of the tube is resiliently deformed by the load of the diaphragm spring to provide cushioning. The resilient tube can have a slot in its outer periphery. In a first stage of cushioning the tube is deformed so as to close the slot. Thereafter, further deformation of the tube is harder and creates a second stage of harder cushioning.

8 Claims, 4 Drawing Sheets

DIAPHRAGM SPRING CLUTCH COVER ASSEMBLY

BACKGROUND OF THE INVENTION

This invention concerns a diaphragm spring friction clutch cover assembly of the type (hereinafter called "the type referred to") comprising a pressure plate, a cover, a diaphragm spring having a plurality of radially inwardly directed fingers, and said diaphragm spring acting between a first annular fulcrum arrangement on the pressure plate and a second annular fulcrum arrangement on the cover.

In use the assembly is secured to a driving member, for example a fly-wheel of a motor vehicle engine, so that a driven plate is clamped between the pressure plate and the driving member by the load of the diaphragm spring, the driven plate being released by an axial effort applied through a release bearing to radially inner ends of the fingers of the diaphragm spring.

In well known clutches comprising cover assemblies of the type referred to the driven plate is cushioned in that it comprises a carrier plate having friction facings mounted on cushioning between the facings. But to simplify and cheapen production of driven plates and to reduce inertia thereof, driven plates with reduced or no cushioning between the friction facings have been proposed. To compensate for this lack of cushioning it has been proposed to incorporate means which provides a degree of axial flexibility or cushioning into one of the annular fulcra. One way of providing the clutch cover assembly with cushioning means which is simple to manufacture and install and yet can provide a subjectively acceptable clutch engagement when mounted in a motor vehicle is disclosed in G.B. No. 1583403. That patent describes a diaphragm spring clutch cover assembly of the type referred to further comprising cushioning means in one of the annular fulcra arrangements, the cushioning means being formed by a single wavy ring having undulations which extend parallel to the axis of the diaphragm spring, and the undulations being constituted by a first series and by a second series of said undulations wherein the undulations of the first series have a lower stiffness but greater axial amplitude and wavelength than the undulations of the second series. During re-engagement of the driven plate (after a disengagement) the initial cushioning is by the first series and then by both series, which ensures that the clamp load increases progressively over a substantial range of movement of the release bearing during clutch re-engagement.

It has been found that in the mass production manufacturing of a wavy ring having undulations of differing stiffnesses and sizes it can be difficult to ensure consistency in the spring characteristics of the wavy rings.

An object of this invention is to provide a diaphragm spring clutch cover assembly of the type referred to capable of being constructed, as will be understood from the ensuing description with reference to the drawings, in which the aforesaid difficulty may be avoided and at the same time that assembly can be used to form a clutch for a motor vehicle in which clutch engagement is subjectively acceptable and the clamp load increases progressively during re-engagement

SUMMARY OF THE INVENTION

According to the invention there is provided a diaphragm spring friction clutch cover assembly of the type referred to characterised in that at least one of said fulcrum arrangements includes cushioning means comprising at least one resilient tube having a cross-section which is resiliently deformable under urging by the diaphragm spring.

The tube can be disposed about the axis of the cover assembly, and preferably the tube is disposed in subtantially circular form about said axis. Or there may be a plurality of the tubes disposed in subtantially circular array about said axis.

The or each tube may have at least one slot through its wall, said slot extending longitudinally along the tube. With respect to the axis of the cover assembly, the slot can face substantially radially outwardly or substantially radially inwardly, and in an unstressed or relatively low stressed state of the or each tube the slot therein is preferably open. Therefore as the load provided by the diaphragm spring increases during clutch re-engagement, the or each tube is increasingly stressed which, in a first stage of cushioning, may cause the slot to close and thereafter, in a second stage of cushioning, deformation of the cross-section of the tube may occur with the opposite sides of the slot in contact.

If desired the or each tube may have in its wall a slot extending about the longitudinal axis of the tube.

The or each tube may be a coil spring. A hoop may pass through the turns of the or each coil spring.

The or each tube may be disposed in a groove. Axially of the assembly, the or each tube in a substantially unstressed state may have a substantially circular cross-section, and said groove may have a base of arcuate shaped cross-section having a radius greater than that of said cross-section of the tube.

BRIEF DESCRIPTION OF THE DRAWINGS

The invention will now be further described by way of example, with reference to the accompanying drawings in which.

FIG. 3 is a section, on an enlarged scale, on a line III—III in FIG. 2 and also showing the diaphragm spring applying no or a minimum load to the resilient tube;

FIGS. 4 and 5 are comparable to FIG. 3 but diagrammatically illustrate successive stages in stressing the tube by increasing the loading thereon by the diaphragm spring during clutch re-engagement;

FIG. 6 is a view similar to FIG. 3 showing an alternative resilient tube, and FIG. 7 shows a stage in the stressing of that tube;

DETAILED DESCRIPTION OF EMBODIMENTS

Figure 1:
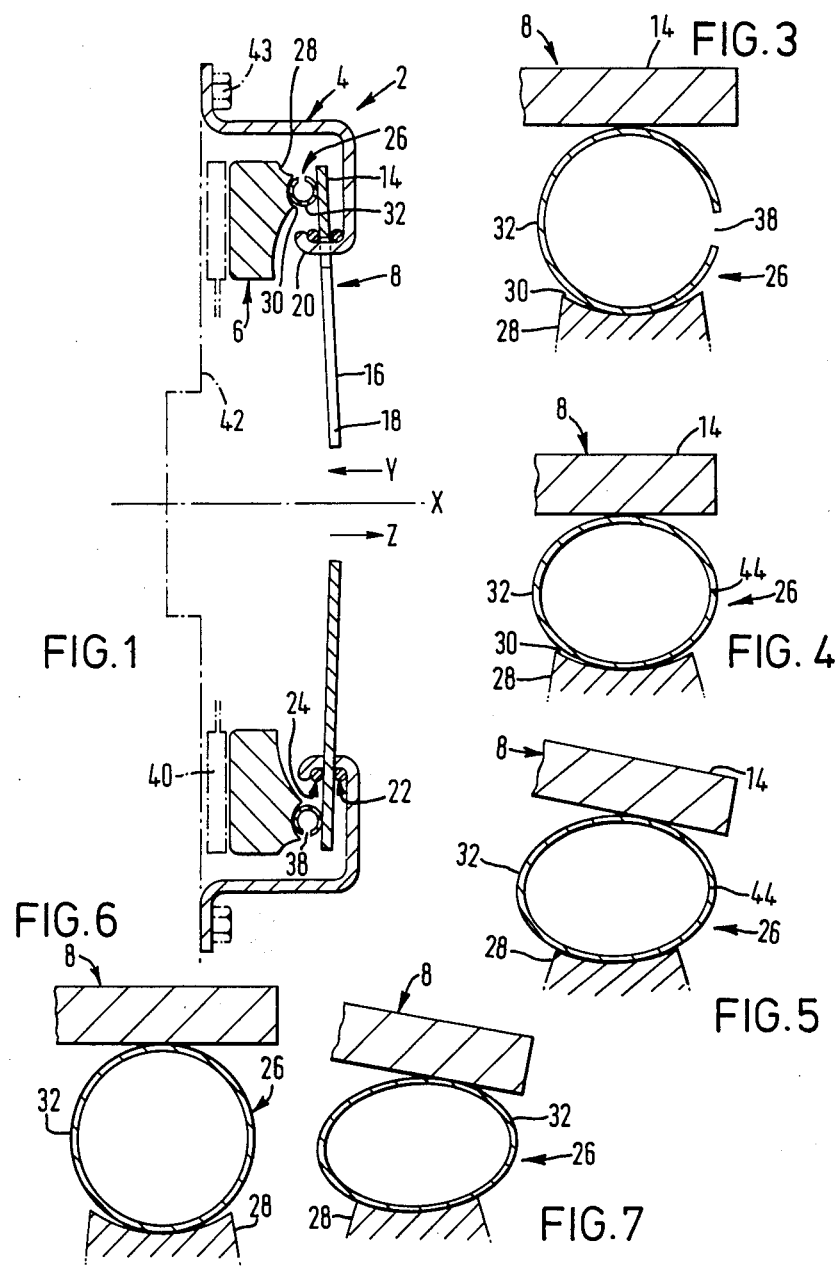
FIG. 1 is a fragmentary and diagrammatic cross-section of a cover assembly formed according to the invention for a push-type clutch.
Figure 2:
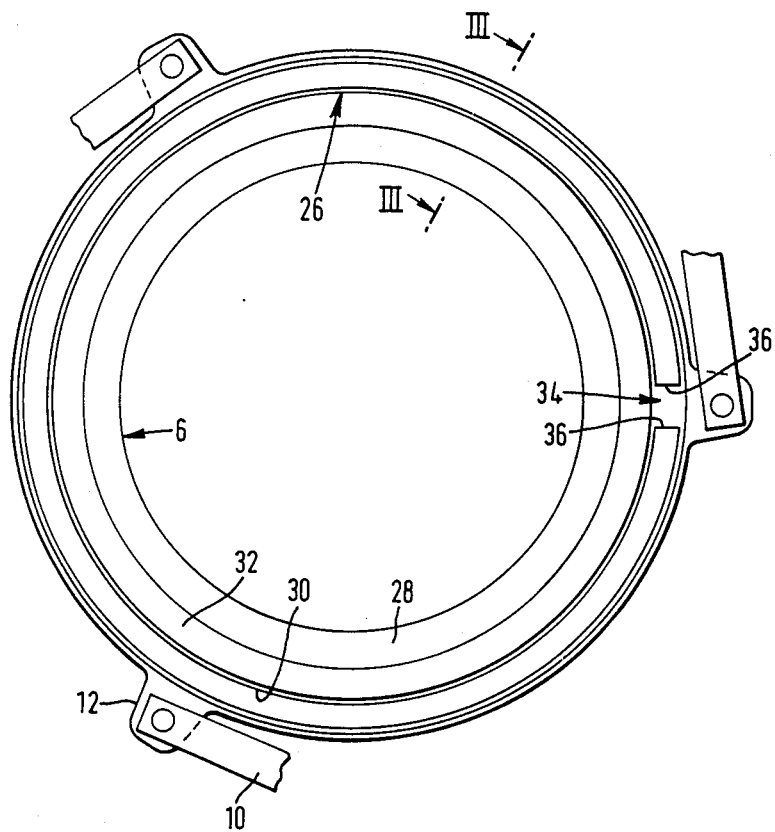
FIG. 2 a plan view of the pressure plate and resilient tube of FIG. 1 showing fragments of known release straps.

Referring to FIGS. 1 to 3 a clutch cover assembly 2 for a push-type friction clutch has a metal cover 4, a pressure plate 6, and a diaphragm spring 8. In known manner combined torque transmission straps and release springs formed by tangential leaf springs 10 interconnect lugs 12 on the pressure plate with the cover 4. Also in known manner the diaphragm spring 8 has a circumferential Belleville portion 14 from which integral fingers 16 divided by slots 18 extended radially inwardly. On the cover 4 axially turned tabs 20 hold a pair of annular fulcra 22 and 24 which engage the diaphragm spring 8 and are constituted by circular wires.

Between the diaphragm spring and pressure plate 6 is another annular fulcrum 26. This comprises an annular land or ridge 28 on the pressure plate, an annular groove 30 extending along the tip of the ridge, and a resilient tube 32 of, for example, metal disposed in the groove. As can be best seen in FIG. 2 the tube 32 is substantially circular with a gap 34 between opposite ends 36 of the tube. Tube 32 is substantially centered on the axis X of the cover assembly 2. As can be best seen in FIGS. 1 and 3, in its unstressed or substantially unstressed state the tube 32 has a substantially circular cross-section with a slit or slot 38 in the tube wall. The slot 38 extends from one end 36 of the tube 32 to the other and is preferably so shaped and disposed that the slot or at least portions thereof close or tend to close as the tube is increaseingly stressed by the diaphragm spring 8. One preferred disposition of the slot 38 is shown in FIGS. 1 and 3 in which slot extends circumferentially along the radially outermost portion (with respect to axis X) of the tube wall so that with respect to axis X the slot faces radially outwardly. In another prefered disposition the slot 38 is in (with respect to the circular cross-section of the tube) the diametrically opposite position to that in FIGS. 1 and 3 and faces radially inwards with respect to axis X.

In use a friction clutch driven plate 40 of any suitable kind known per se is disposed between the pressure plate 6 and a rotatably driven driving member 42 to which the cover 4 may be secured by bolts 43. For example the driving member or counter-pressure plate 42 may be driven by an engine of a motor vehicle and may be a fly-wheel.

In FIG. 1 the clutch comprising the cover assembly 2 is shown fully dis-engaged a release bearing (not shown) having pushed the fingers 16 in direction Y. To re-engage the clutch the pushing effort by the release bearing is reduced allowing the fingers 16 to swing in direction Z so that the Belleville portion 14 applies an increasing load to the pressure plate 6 to increasingly clamp the driven plate 40 between the pressure plate and the member 42. During this increase in loading by the diaphragm spring 8 the tube 32 is increasingly compressed against its resilience to deform its cross-sectional shape and thus provide cushioning having a subjectively acceptable feel. Initially the tube 32 is less stiff as it is deformed to close the slot 38 and provides a first stage of cushioning to the point where the opposite sides of the slot meet at 44 as in FIG. 4. Now the tube 32 becomes more stiff and provides harder cushioning as a second stage as its cross-sectioned shape is deformed further by the diaphragm spring 8 to become more elliptical (FIG. 5).

As shown, the groove 30 can have a curved or arcuate cross-sectional shape to accommodate the deformation of the tube 32, although the groove may have any other accomodating shape.

In FIG. 6 a modified tube 32 is shown having no slot 38 (FIG. 3) in its wall, FIG. 7 showing a stage in the deformation of the modified tube as the latter provides cushioning.

Figure 8:
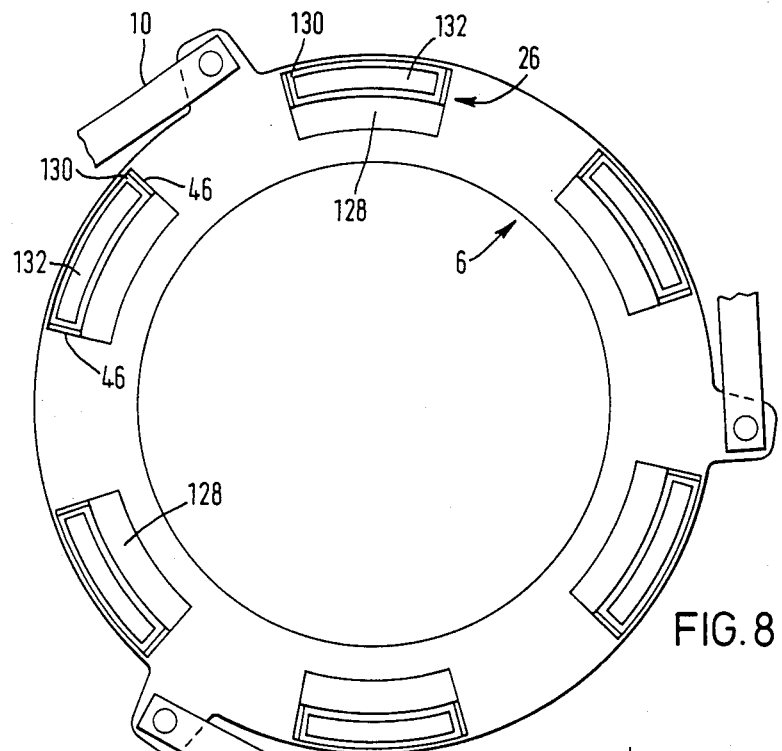
FIG. 8 is a view similar to FIG. 2 of modification of the cover assembly formed according to the invention using a plurality of short resilient tubes.

With reference to FIG. 8 the fulcrum 26 is modified in that it comprises a plurality of angularly spaced lands or ridges 128 on the pressure plate each land having in its tip a respective arcuate groove 130 each containing a respective resilient arcuate tube 132 which may be formed with or without a slot (38 in FIGS. 1 and 3) in its wall. The tubes 132 are disposed in substantially circular array substantially centered on the axis X. Each groove 130 may have a similar cross-section shape to the groove 30 (FIG. 3) and preferably has end walls 46 to retain the corresponding tube 132 in a given circumferential position relative to the pressure plate.

Figures 9, 10, 11:
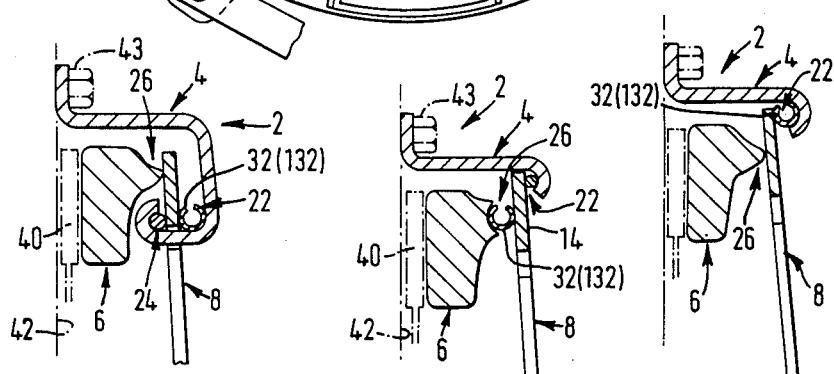
FIG. 9 is a fragmentary and diagrammatic section of another embodiment of cover assembly formed according to the invention for a push-type clutch, and FIGS. 10 and 11 fragmentary and diagrammatic sections of two futher embodiments of cover assembly formed according to the invention, each for a pull-type clutch.

In FIG. 9 the fulcrum 26 on the pressure plate is of a conventional kind whereas fulcrum 22 comprises an aforedescribed tube 32 or aforedescribed tubes 132.

The cover assembly 2 in FIG. 10 for a pull-type clutch has a fulcrum 26 on the pressure plate similar to any of the fulcra 26 in FIGS. 1 to 8. Therefore in FIG. 10 the fulcrum 26 can comprise an aforedescribed tube 32 or a plurality of aforedescribed tubes 132, the fulcrum 22 on the cover 4 being a wire annulus. When tubes 132 are used means (not shown) are provided to maintain the circumferential positions of the tubes.

In the pull-type clutch cover assembly 2 in FIG. 11 the fulcrum 26 is of conventional kind, and fulcrum 22 comprises an aforedescribed tube 32 or aforedescribed tubes 132. In the case of the latter, means (not shown) are again provided to maintain the circumferential positions of the tubes 132.

In each of FIGS. 9 and 11 the fulcrum 26 can also be similar to any of the fulcra 26 in FIGS. 1 to 8.

Figure 12:
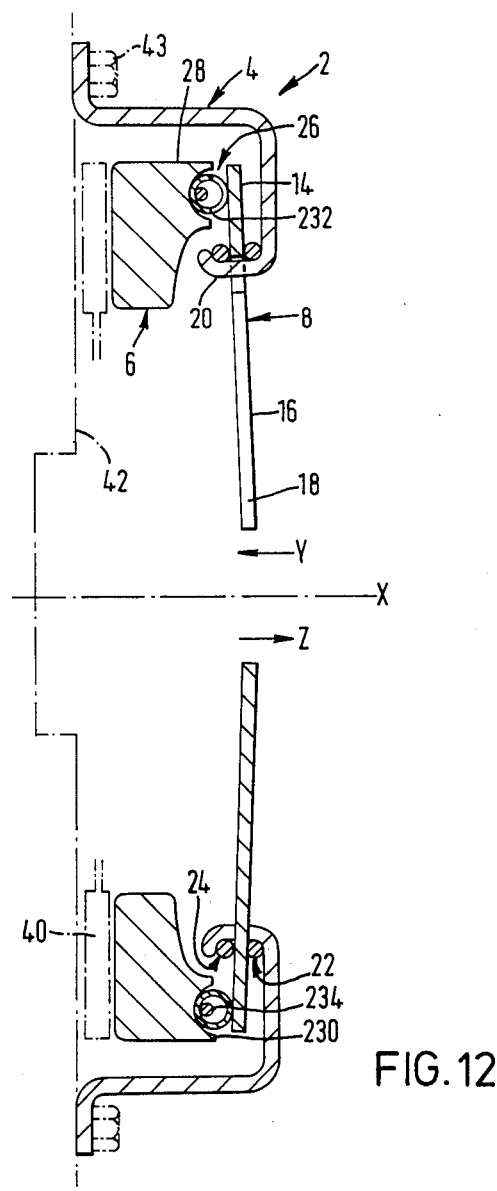
FIG. 12 is a fragmentary and diagrammatic cross-section of another embodiment of a cover assembly formed according to the invention for a push-type clutch.

In FIG. 12 the annular fulcrum 26 comprises the annular land or ridge 28 on the pressure plate, an annular groove 230 extending along the tip of the ridge, and a resilient tube 232 of, for example, metal disposed in the groove.

The groove 230 is arcuate in cross-section, for examplesemi-circular. The tube 232 is a coil spring, for example an helical coil spring, having in unstressed state substantially circular coils of lesser external radius than the radius of the cross-section of the groove 230. The coil spring 232 is disposed substantially in the form of a circle substantially centered on the axis X of the cover assembly. The coil spring 232 may be floppy and may have fairly open turns or coils which may be of thin wire. The coils at opposite ends of the circularly disposed spring 232 may be in contact to complete the circle and may be secured together. An assembly hoop 234, which may be of wire, passes through the coils of the spring 232. The hoop 234 may have any desired cross-sectional diameter and/or shape. Since the tube 232 is a coil spring, there is in effect a slot or slit between adjacent coils. Because the coil spring 232 is disposed in a circle that slot or slit extends around the axis X and around the axis of the coils which latter axis constitutes the longitudinal axis of the tube 232 and surrounds the axis X.

The clutch comprising the cover assembly 2 in FIG. 12 is shown fully dis-engaged. When, for example, a clutch pedal is released for re-engagement of the clutch and the Belleville portion 14 moves towards the pressure plate 6, the turns of the coil spring 232 are deformed by the diaphragm spring 8 until each of them follows the contour of the groove 230 and the remaining minor portion forms a stiff curve which spans the mouth of that groove. These stiff curves present a concave arch to the groove 230 and serves as a rigid abutment for the diaphragm spring 8. The diaphragm spring 8 then applies axial load to the pressure plate 6 through the turns of the coil spring 232 that are seated within the groove 230 to clamp the driven plate 40 between the pressure plate 6 and the driving member 42. The resilient resistance to deformation of the turns of the coil spring 232 leads to re-engagement of the clutch being progressive. Also the resilience of the turns of the coil spring 232 acts through the diaphragm spring 8 to increase the movement of the clutch release mechanism in the direction Z over which the axial load that is applied by the diaphragm spring to the pressure plate 6 increases from zero to maximum.

During assembly of the cover assembly a length of wire can be threaded through the turns of the coil spring 232 and then bent to form the hoop 234, and its ends may be joined together The coil spring 232 is released so that it expands to bring its end coils together or nearly together. The hoop 234 and coil spring 232 are maneuvered until the coil spring is located the groove 230.

The extent to which the coils of spring 232 are permitted to deform or collapse may be controlled by choosing an appropriate thickness for the wire of the hoop 234 which may act as a stop for further coil deformation.

The land or ridge 28 in FIG. 12 may have radial interuptions extending therethrough so that the arrangement 28 is formed by an annular array of circumferentially spaced lands each with a respective groove 230 in its tip. Each of those grooves can contain a respective arcuate tube or coil spring 232 so that the coil springs 232 are in a circular array about the axis X and are all on the same hoop 234.

In addition or as an alternative, the fulcrum 22 can be substituted by a coil spring tube or tubes similar to 232.

The invention as described with reference to FIG. 12 may also be applied to a cover assembly for a pull-type clutch in which fulcrum 24 is omitted and fulcrum 22 on the cover has a greater diameter than the fulcrum arrangement 26.

We claim:

1. A diaphragm spring friction clutch cover assembly comprising a pressure plate extending about an axis of the cover assembly, a cover, a diaphragm spring having a plurality of radially inwardly directed fingers, said diaphragm spring applying force to a first annular fulcrum arrangement on the pressure plate and to a second annular fulcrum arrangement on the cover, at least one of said fulcrum arrangements including cushioning means comprising at least one resilient tube extending longitudinally along At least part of substantially circular locus which is substantially co-axial with said cover assembly, said tube being hollow and having a cross-section which is resiliently deformable under force applied to the tube from the diaphragm spring during clutch re-engagements, said tube having a wall with a slot through said wall, said slot extending longitudinally along said tube, and said slot wholly facing substantially radially of said axis, wherein in a relatively low stressed state of said tube, by said diaphragm spring, said slot is open whereby opposite sides of the slot are spaced apart, and wherein deformation of said tube is for cushioning said clutch re-engagements in which at least an initial deformation of said tube brings said sides of the slot closer together.

2. a clutch cover assembly according to claim 1, wherein said tube is resiliently deformable under increasing force from the diaphragm spring whereby an initial increase in said force deforms the tube thereby bringing said opposite sides of the slot into contact and further increase in said force deforms said tube further.

3. A clutch cover assembly according to claim 1, wherein said tube extends in a shape which is substantially a circle.

4. A clutch cover assembly according to claim 1, wherein said tube has opposite ends which are spaced apart.

5. A clutch cover assembly according to claim 1, wherein there is a plurality of said tubes disposed in substantially circular array about the axis of the assembly.

6. A clutch cover assembly according to claim 1, wherein one of said pressure plate and said cover has a groove, and said tube is disposed in said groove.

7. a clutch cover assembly according to claim 6, wherein radially of the axis of the assembly, said tube in a substantially unstressed state has a substantially circular external cross-section and said groove has a base of arcuate shaped cross-section having a radius greater than that of said cross-section of said tube.

8. A clutch comprising a cover assembly according to claim 1 mounted on a driving plate, and there being a driven plate disposed for clamping between said driving plate and said pressure plate.

* * * * *